Sept. 8, 1964  J. W. BARNES  3,147,628
ERECTION MEANS FOR VERTICAL GYROSCOPES
Filed Sept. 14, 1961
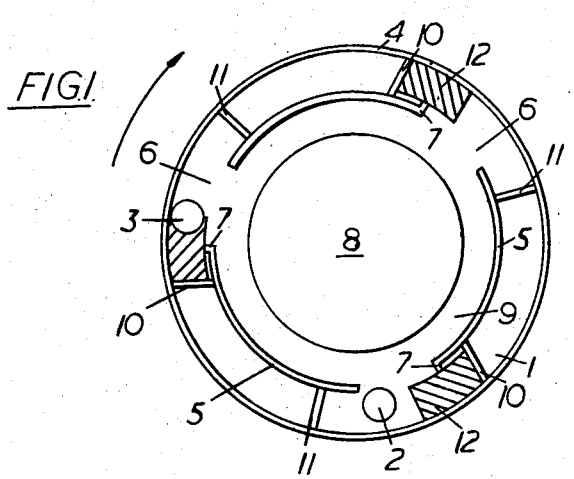
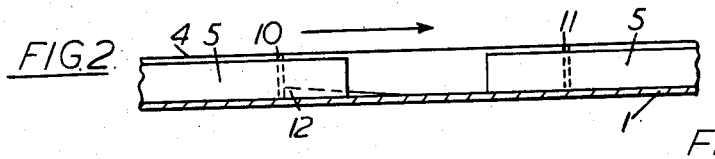
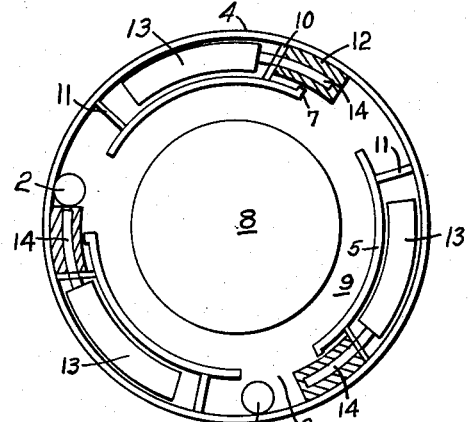
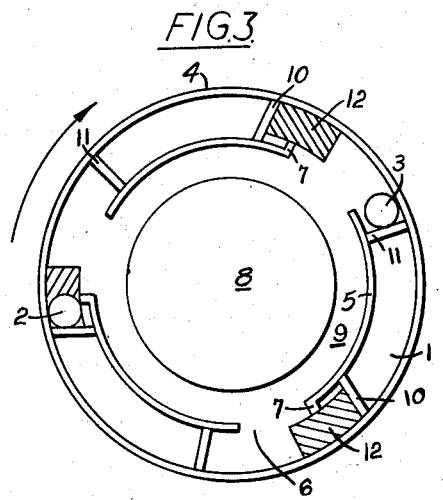
Inventor
JEFFERY W. BARNES
By
Cameron, Kerkam & Sutton
Attorneys

United States Patent Office 3,147,628
Patented Sept. 8, 1964

3,147,628
ERECTION MEANS FOR VERTICAL GYROSCOPES
Jeffery Walton Barnes, Farnborough, England, assignor to Ferranti, Limited, Hollinwood, Lancashire, England, a company of Great Britain and Northern Ireland
Filed Sept. 14, 1961, Ser. No. 138,126
Claims priority, application Great Britain, Sept. 16, 1960, 31,900/60
6 Claims. (Cl. 74—5.44)

This invention relates to erection means for vertical gyroscopes.

More specifically the invention relates to erection means of the kind including a disc mounted coaxially, or nearly coaxially, with the rotor of the the gyroscope, one or more balls free to roll on the upper surface of the disc, one or more traps arranged on the periphery of the disc, at least said traps being arranged to rotate about the axis of said disc in the same direction as, and at a lower speed than, said rotor, the arrangement being such that in operation when the disc is tilted from the horizontal, i.e. when the gyro spin axis is tilted, each ball rolls into a trap when at the lowest point on the disc and is carried round until the trap approaches the highest point, whereupon the ball rolls out of the trap and returns to the lowest point. Such erection means are hereinafter referred to as erection means of the kind specified.

In erection means of the kind specified precession of the gyro spin axis towards the vertical takes place because each ball is displaced sideways relative to the direction of tilt of the disc and the weight of the balls exerts a torque of the correct sense to cause erection of the gyro spin axis. When the disc is level the balls are carried round with the disc and their mean weight moment about the spin axis will be zero, but their instantaneous moment will not, in general, be zero, and there will accordingly be a nutation of the gyroscope. This nutation, however, may be made to fall within tolerable limits by ensuring that the disc does not rotate too slowly.

In erecting means for vertical gyroscopes it is usually desirable to include an acceleration responsive erection cut-out means, i.e. some means for stopping the action of the erecting means when the horizontal acceleration to which the gyroscope is subjected exceeds a predetermined value, and it is an object of the present invention to provide an erecting means of the kind specified with acceleration responsive cut-out means.

According to the present invention erection means for a vertical gyroscope includes a disc mounted substantially coaxially with the rotor of the gyroscope, at least one ball free to roll on the upper surface of said disc and at least one trap arranged on the periphery of said disc and adapted for rotation about the axis of said disc in the same direction as, and at a lower speed than, said rotor such that in operation when said disc is tilted from the horizontal each said ball rolls into a trap when at the lowest point on said disc, and acceleration responsive erection cut-out means which, whilst said disc is tilted from the horizontal by more than a predetermined angle, constrain each said ball to remain in a trap during the whole of each revolution of said trap, but when the surface of said disc is tilted from the horizontal by less than said predetermined angle, constrain each said ball to remain in a trap for less than half of each revolution of said trap.

Said one or more traps may be formed by one or more openings in a circular partition projecting from the upper surface of said disc and a further partition extending from said circular partition to a peripheral rim on said disc, said further partition being positioned on the trailing side of said opening and spaced therefrom by a distance greater than the radius of said balls, and said constraining means may comprise a ramp within each trap, said ramp extending upwards from said opening towards said further partition and rising from the surface of said disc at an angle equal to said predetermined angle.

One embodiment of the present invention will now be described by way of example with reference to the accompanying drawings in which:

FIGURE 1 is a plan view of one form of erecting means in accordance with the invention, the gyro spin axis being tilted slightly from the vertical, FIGURE 2 is a developed view of part of FIGURE 1, FIGURE 3 is a plan view of the erecting means shown in FIGURE 1, but with the gyro-spin axis tilted further from the vertical, and FIGURE 4 is a plan view of a modified form of the erecting means shown in FIGURE 1.

Referring now to the drawings, the erecting means shown includes a disc 1 mounted coaxial with the gyro rotor (not shown) which is disposed below the disc 1. The disc 1 is driven from the gyroscope motor (not shown) through suitable reduction gearing (not shown) so as to rotate in the same direction as the gyro rotor but at a lower speed e.g. between five and ten revolutions per minute.

Two balls 2 and 3 are free to roll on the upper surface of the disc 1 which has a peripheral rim 4 to prevent the balls rolling off. The upper surface of the disc 1 also has a circular partition 5 spaced from the rim 4 by a distance slightly greater than the diameter of the balls 2 and 3 and having three openings 6 through which the balls 2 and 3 may freely pass. The parts of the partition 5 forming the trailing edges of the openings 6 are turned towards the rim 4 to form lips 7. A central boss 8 has a diameter such that a channel 9 is formed between the boss 8 and the partition 5 in which the balls 2 and 3 may roll freely.

Three further partitions 10 extend between the circular partition 5 and the rim 4, each partition 10 being spaced from the trailing side of one of the openings 6 by a distance approximately equal to the diameter of the balls 2 and 3. Three similar partitions 11 extend between the circular partition 5 and the rim 5 on the leading side of the openings 6. The partitions 5, 10 and 11 thus form three peripheral traps into which the balls 2 and 3 may roll through the openings 6.

In each trap so formed there is provided a ramp 12 shown shaded in FIGURES 1 and 3. As may be seen more clearly from FIGURE 2, which shows a developed view of one of the traps, the ramps 12 extend from the openings 6 and rise from the surface of the disc 1 to the partitions 10 at an angle of approximately ten degrees.

In operation, when the gyro spin axis is vertical the plane of the disc 1 is horizontal and the balls 2 and 3 are carried round with the disk 1. As previously explained, the mean weight moment of the balls 2 and 3 will be zero but the instantaneous moment will not, in general, be zero and there will accordingly be a slight nutation of the gyroscope. This nutation, however, is well within tolerable limits due to the speed of rotation of the disc 1.

When the gyro spin axis is tilted from the vertical the balls 2 and 3 roll to the lowest point on the disc 1.

In FIGURE 1 the gyro spin axis is shown tilted towards the bottom of the drawing, the ball 2 being shown at the lowest point on the disc 1. As the disc 1 rotates the ball 2 comes into contact with the base of the ramp 12 and, provided the angle of tilt is less than ten degrees, the ball will not be able to roll up the ramp and will therefore be carried round with the disc to a position such as that in which the ball 3 is shown. Meanwhile, the same rotation of the disc will have caused the ball 3 to be carried slightly further than the position in which it is shown, whereupon the ball 3 rolls away from the ramp 12 into the channel 9 and returns to the lowest point, entering the next trap through the opening 6. The balls 2 and 3 are therefore effectively displaced sideways relative to the direction of tilt and the weight of the balls exerts a torque of the correct sense to cause erection of the gyro spin axis.

If, however, the angle of tilt exceeds ten degrees, which corresponds approximately to a horizontal acceleration of five and a half feet per second per second, the surface of each ramp 12 becomes horizontal or sloping downwards and the balls 2 and 3 are therefore able to roll onto the ramps. FIGURE 3 shows an angle of tilt greater than ten degrees, again towards the bottom of the drawing, the ball 2 now being shown on one of the ramps 12. As the disc 1 rotates the ball 2 is now unable to roll off the ramp 12 due to the partition 5 and the lip 7 and is carried round with the disc until it is past the highest point. Shortly after passing the highest point the lip 7 is no longer able to prevent the ball 2 from rolling off the ramp 12. The ball 2, however, now only rolls along the trap until it is stopped by the partition 11, the ball 3 being shown in this position in FIGURE 3. The balls 2 and 3 are thus constrained to remain in the traps during the whole of each revolution of the disc 1 and, since they are not effectively displaced sideways relative to the angle of tilt, no erecting torque is exerted on the gyroscope. The oscillation of the balls 2 and 3 between the partitions 10 and 11 causes a slight nutation of the gyroscope, but this is small enough to be of no importance. When the angle of tilt again becomes less than ten degrees the balls 2 and 3 roll off the ramps and operate to cause an erecting torque to be exerted in the same way as described above.

The erecting means described above thus has an acceleration responsive cut-out which does not involve the use of any additional moving parts. The value of acceleration at which the cut-out becomes effective is simply determined by the angle of slope of the ramp 12.

It will be appreciated that the erecting means described above may be varied in many ways. For example, in some instances it may be desirable that the disc 1 remain stationary and only the traps, i.e., the partitions 5, 10 and 11, and the ramps 12 be rotated. In this case the balls are kept rotating while in the traps but not on the ramps and thus more readily roll out of a trap since dynamic friction is less than static friction. Furthermore, the disc has been described above as mounted coaxially with the gyro rotor. It is sometimes desired, however, to introduce a tilt of the gyro spin axis relative to the vertical so as to give automatic compensation for certain types of errors during turning flight. If such automatic compensation is desired it is necessary for the axis of the disc 1 to be tilted slightly with respect to the gyro spin axis such that the disc 1 is horizontal when the gyro spin axis is in its vertical-indicating position.

It is also sometimes desirable to prevent the operation of the acceleration responsive erection cut-out means. For example, the gyro spin axis may be tilted by more than the predetermined angle from the vertical after starting the gyro rotor before take-off or due to toppling during aerobatics, and in such cases the cut-out means is not required to operate since the gyro spin axis should be erected as soon as possible. To prevent the operation of the cut-out means described above it is necessary to prevent the balls rolling onto the ramps. This may be achieved in one way by providing in each of the enclosed spaces between the partitions 10 and 11 an electro-magnetic solenoid 13 (FIGURE 4) having a spring returned plunger 14 which, when the solenoid 13 is energised, projects through the partition 10 and extends over the ramp 12 as shown in FIGURE 4. The plunger thus prevents a ball from rolling onto the ramp, and removes any ball already on the ramp. When the solenoid 13 is de-energised the plunger 14 is returned by the spring (not shown) thus leaving the ramp 12 free. Energisation of the solenoid 13 may be controlled by a switch operable by the pilot.

The erecting device has been described as having two balls free to roll on the disc, but the device will operate satisfactorily with only one ball or with more than two balls.

What I claim is:

1. Erection means for a vertical gyroscope including a disc mounted substantially coaxially with the rotor of the gyroscope, at least one ball free to roll on the upper surface of said disc and at least one trap arranged on the periphery of said disc and adapted for rotation about the axis of said disc in the same direction as, and at a lower speed than, said rotor such that in operation when said disc is tilted from the horizontal each said ball rolls into a trap when at the lowest point on said disc, and acceleration responsive erection cut-out means which, whilst said disc is tilted from the horizontal by more than a predetermined angle, constrain each said ball to remain in a trap during the whole of each revolution of said trap, but when the surface of said disc is tilted from the horizontal by less than said predetermined angle, constrain each said ball to remain in a trap for less than half of each revolution of said trap.

2. Erection means as claimed in claim 1 in which each said trap is formed by an opening in a circular partition projecting from the upper surface of said disc and a furthere partition extending from said circular partition to a peripheral rim on said disc, said further partition being positioned on the trailing side of said opening and spaced therefrom by a distance greater than the radius of each said ball.

3. Erection means as claimed in claim 2 in which said cut-out means comprises a ramp within each trap, said ramp extending upwards from said opening towards said further partition and rising from the surface of said disc at an angle equal to said predetermined angle.

4. Erection means as claimed in claim 1 including means for preventing the operation of said cut-out means.

5. Erection means as claimed in claim 3 including for each said trap a plunger which may be operated to extend from said further partition to said opening and thereby prevent each said ball from rolling onto said ramp.

6. Erection means as claimed in claim 5 in which said plunger is operated by means of an electro-magnetic solenoid.

References Cited in the file of this patent
FOREIGN PATENTS
785,614    France _____ May 20, 1935